United States Patent
Kuribara

(10) Patent No.: US 9,990,948 B1
(45) Date of Patent: Jun. 5, 2018

(54) DISK DEVICE WITH STOPPER FOR MOVABLE MEMBER

(71) Applicant: Kabushiki Kaisha Toshiba, Minato-ku, Tokyo (JP)

(72) Inventor: Hirofumi Kuribara, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/460,581

(22) Filed: Mar. 16, 2017

Related U.S. Application Data

(60) Provisional application No. 62/430,686, filed on Dec. 6, 2016.

(51) Int. Cl.
  *G11B 5/55* (2006.01)
  *G11B 5/105* (2006.01)

(52) U.S. Cl.
  CPC ............ *G11B 5/5526* (2013.01); *G11B 5/105* (2013.01)

(58) Field of Classification Search
  CPC .............................. G11B 5/5526; G11B 5/105
  See application file for complete search history.

(56) References Cited

U.S. PATENT DOCUMENTS

| | | | | |
|---|---|---|---|---|
| 5,365,389 A | * | 11/1994 | Jabbari | G11B 5/54 360/265.1 |
| 5,745,325 A | * | 4/1998 | Matsumoto | G11B 5/4813 360/265.1 |
| 5,864,447 A | * | 1/1999 | Matsumoto | G11B 5/54 360/265.1 |
| 5,905,606 A | * | 5/1999 | Johnson | G11B 5/54 360/265.1 |
| 6,226,143 B1 | * | 5/2001 | Stefanksy | G11B 5/5526 360/99.2 |
| 6,690,549 B1 | * | 2/2004 | Aikawa | G11B 5/4813 360/264.4 |
| 7,609,486 B1 | * | 10/2009 | Little | G11B 5/5569 360/266.1 |
| 2005/0111141 A1 | | 5/2005 | Price | |

FOREIGN PATENT DOCUMENTS

| | | |
|---|---|---|
| JP | 02-029579 Y2 | 8/1990 |
| JP | 2006-194264 A | 7/2006 |

\* cited by examiner

*Primary Examiner* — Brian Miller
(74) *Attorney, Agent, or Firm* — White & Case LLP

(57) ABSTRACT

According to one embodiment, a stopper of a disk device includes a fixing member to be fixed to a supporter of the disk device, and a cushioning member formed of a fluorine rubber and attached to the fixing member. The cushioning member includes a contact surface which contacts the fixing member, a first contact surface which can contact the supporter of the disk device, and a second contact surface which can contact a movable member in the disk device, the first contact surface has a first surface adhesive force based on adhesion of the fluorine rubber, and the second contact surface is subjected to a non-adhesive surface treatment and has a second surface adhesive force which is less than or equal to 1/20 the first surface adhesive force.

11 Claims, 6 Drawing Sheets

DISK DEVICE WITH STOPPER FOR MOVABLE MEMBER

CROSS-REFERENCE TO RELATED APPLICATIONS

This application claims the benefit of U.S. Provisional Application No. 62/430,686, filed Dec. 6, 2016, the entire contents of which are incorporated herein by reference.

FIELD

Embodiments described herein relate generally to a stopper used for a disk device, and a disk device comprising the stopper.

BACKGROUND

A magnetic disk drive which functions as a disk device comprises a housing which includes a base and a top cover, and the housing accommodates a rotatable magnetic disk and a rotatable head actuator which supports a magnetic head. The housing further accommodates a stopper which stops the head actuator, which is a movable member, at a predetermined rotation position, or a stopper which regulates a range of movement of another movable member.

To reduce the collision impact of the head actuator or the other movable member on the stopper, the stopper comprises a cushioning member (stopper rubber) which is made of a rubbery elastic material or the like. As the material of the cushioning member, in light of impact attachment characteristics, fluorine rubber is often used. However, fluorine rubber is highly adhesive, and if the head actuator is left in contact with the cushioning member for a long time, the head actuator will be fixed to the cushioning member. In that case, the head actuator will not move next time when the disk device is activated.

To prevent such fixation, a method of providing a plurality of projections on the outer surface of the cushioning member and reducing the contact surface of the cushioning member with respect to the head actuator, a method of providing a fixation prevention film on the surface of the cushioning member, and the like have been proposed.

DETAILED DESCRIPTION

Various Embodiments will be described hereinafter with reference to the accompanying drawings. In general, according to one embodiment, a stopper of a disk device comprises: a fixing member which is to be fixed to a supporter of the disk device; and a cushioning member formed of a fluorine rubber and attached to the fixing member. The cushioning member comprises a contact surface which contacts the fixing member, a first contact surface which can contact the supporter of the disk device, and a second contact surface which can contact a movable member in the disk device, the first contact surface has a first surface adhesive force based on adhesion of the fluorine rubber, and the second contact surface is subjected to a non-adhesive surface treatment and has a second surface adhesive force which is less than or equal to $\frac{1}{20}$ the first surface adhesive force.

As the disk device, a hard disk drive (HDD) of an embodiment will be described.

Figure 1:
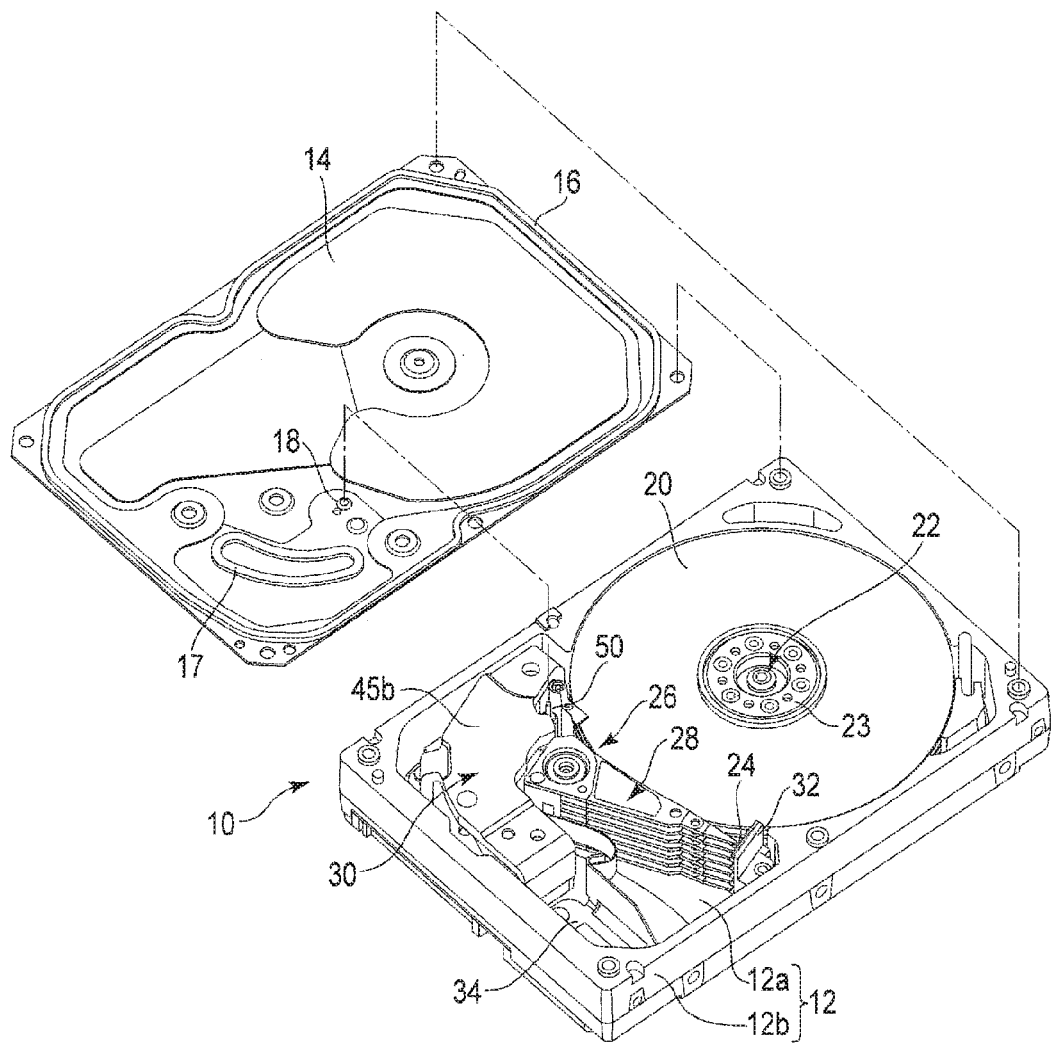
FIG. 1 is a perspective view of an external appearance of a hard disk drive (HDD) of a first embodiment.
Figure 2:
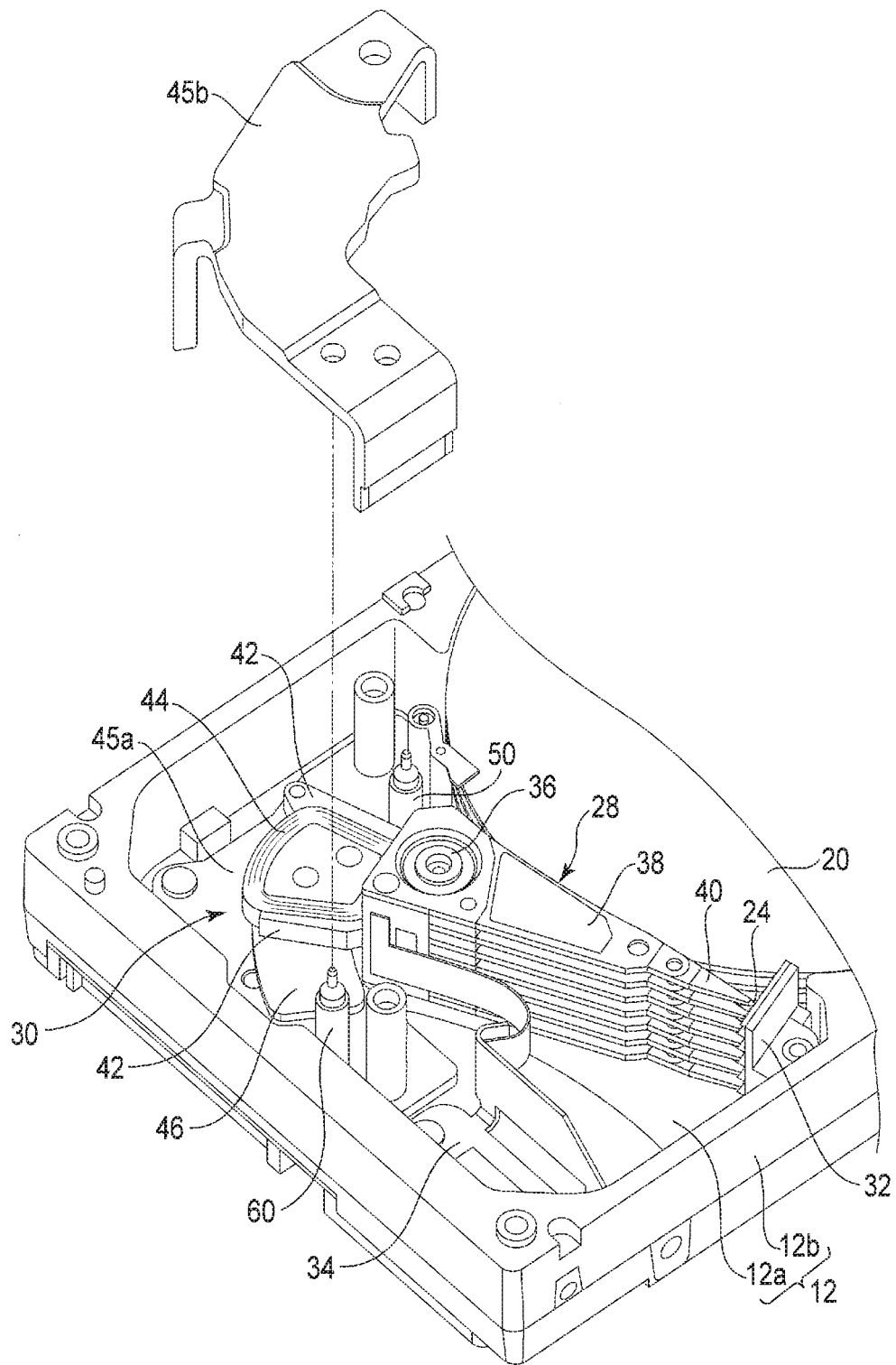
FIG. 2 is an exploded perspective view of a carriage and a voice coil motor (VCM) of the HDD.

FIG. 1 is an exploded perspective view of the internal structure of the HDD of the embodiment, and FIG. 2 is an exploded perspective view of a carriage and a VCM of the HDD.

As shown in FIG. 1, the HDD comprises a flat and substantially-rectangular housing 10. The housing 10 includes a base 12 which is formed in the shape of a rectangular box and has an open upper surface, and a top cover 14 which is secured to the base 12 by a plurality of screws and closes the upper end opening of the base 12. The base 12 includes a rectangular bottom wall 12a which is spaced apart from the top cover 14 and is opposed to the top cover 14, and a side wall 12b which stands along the periphery of the bottom wall 12a, and for example, the base 12 is aluminum and is integrally formed. The top cover 14 is, for example, a SUS plate which is pressed into a rectangular plate which has substantially same dimensions as those of the bottom wall 12a of the base 12. A frame-shaped gasket (packing or seal) 16 is provided along the periphery of the inner surface of the top cover 14. When the top cover 14 is attached to the base 12, the gasket 16 is held between the upper surface of the side wall 12b and the top cover 14 and keeps the inside of the housing 10 airtight. Further, a ring-shaped cushion 17 and a disk-shaped packing 18 are provided on the inner surface of the top cover 14. When the top cover 14 is attached to the base 12, the cushion 17 will contact one yoke of a VCM, which will be described later, and the packing 18 will contact one end of a stopper, which will be described later.

The housing 10 accommodates a plurality of magnetic disks 20 as disk-shaped recording media, and a spindle motor 22 as a drive section which supports and rotates the magnetic disks 20. The spindle motor 22 is provided on the bottom wall 12a. Each of the magnetic disks 20 has a diameter of, for example, 88.9 mm (3.5 inches) and has a magnetic recording layer on the upper surface or the lower surface. The magnetic disks 20 are coaxially engaged with a hub (not shown) of the spindle motor 22, are clamped by a clamp spring 23, and are fixed to the hub. In this way, the magnetic disks 20 are supported in parallel to the bottom wall 12a of the base 12. The magnetic disks 20 are rotated at a predetermined rotation rate by the spindle motor 22.

Note that, although the number of the magnetic disks 20 accommodated in the housing 10 is assumed to be, for example, five in the present embodiment as shown in FIG. 1, the number of the magnetic disks 20 is not limited to five. Further, a single magnetic disk 20 may be accommodated in the housing 10.

The housing 10 further accommodates a plurality of magnetic heads 24 which record or reproduce information on or from the magnetic disks 20, and a head actuator 26 which movably supports these magnetic heads 24 with respect to the magnetic disks 20. The head actuator 26 comprises a carriage 28 which is rotatably provided on the base 12 and supports the magnetic heads 24, and a voice coil motor (hereinafter referred to as a VCM) 30 which rotates and positions the carriage 28. Further, the housing 10 also accommodates a ramp load mechanism 32 which holds the magnetic heads 24 in an unload position which is away from the magnetic disks 20 when the magnetic heads 24 move to the outermost circumference of the magnetic disks 20, and a substrate unit 34 on which electronic components such as a conversion connector are mounted. The substrate unit 34 is formed of a flexible printed circuit (FPC) board, and the FPC board is electrically connected to the magnetic heads 24 and the voice coil of the VCM 30 via a junction FPC board on the carriage 28.

As shown in FIGS. 1 and 2, the carriage 28, which functions as a movable member in the present embodiment, comprises a bearing unit 36 which is rotatably provided on the base wall 12a of the base 12, a plurality of arms 38 which extend from the bearing unit 36, and a plurality of suspensions 40 which extend from the respective arms 38, and the magnetic heads 24 are supported at the distal ends of the suspensions 40, respectively. Here, such a structure where the sleeve of the bearing unit 36 is integrally formed with the arms 38, that is, the so-called E block may also be adopted. The carriage 28 comprises a support frame 42 which extends from the bearing unit 36 in the opposite direction with respect to the arms 38. A voice coil 44, which constitutes a part of the VCM 30, is supported by the support frame 42. The VCM 30 includes a pair of yokes 45a and 45b which is provided on the bottom wall 12a of the base 12, and a magnet 46 which is fixed to at least one of these yokes.

Figure 3:
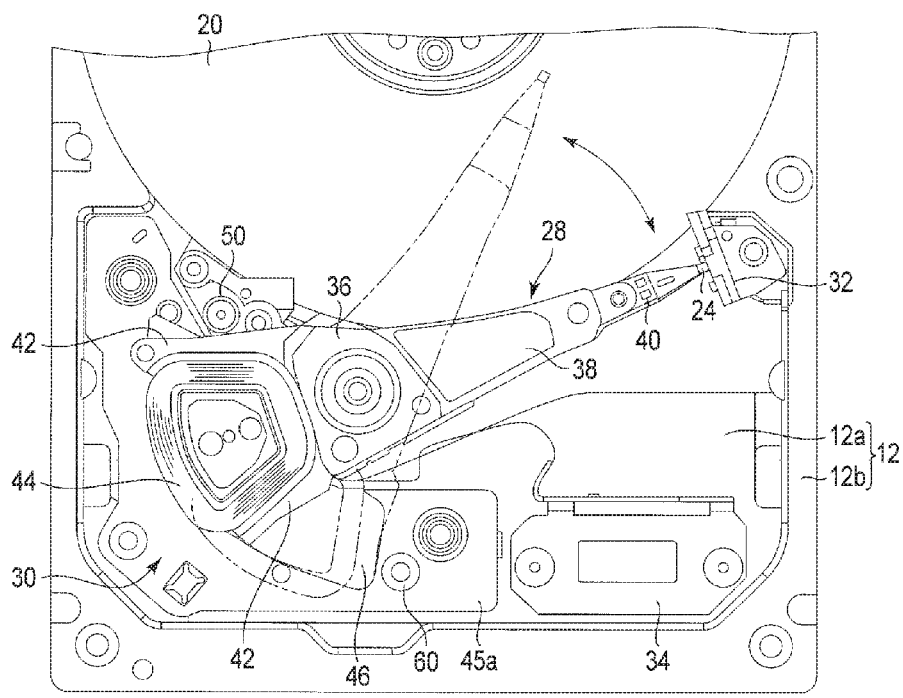
FIG. 3 is a plan view of the carriage and the VCM of the HDD in a state where one yoke is removed from the HDD.

FIG. 3 is a plan view of the carriage and the VCM of the HDD in a state where one yoke is removed from the HDD.

As shown in FIGS. 1 to 3, the yoke 45a of the VCM 30 is mounted on and fixed to the bottom wall 12a of the base 12. The other yoke 45b is spaced apart and is opposed to the one yoke 45a. The voice coil 44 of the VCM 30 is interposed between the pair of yokes 45a and 45b and is opposed to the magnet 46. When a current is applied to the voice coil 44, a magnetic field is produced. Further, as the magnetic filed interacts with the magnetic field of the magnet 46, the carriage 28 is rotated.

In the housing 10, an outer stopper 50 and an inner stopper 60 which regulate the rotation range of the carriage 28 are provided. The outer stopper 50 stands on the bottom wall 12a of the base 12 which functions as a supporter, and is arranged near the magnetic disks 20 and the yoke 45a. As shown by solid lines in FIG. 3, when the carriage 28 rotates clockwise from the outer circumference of the magnetic disks 20 up to such a position where the magnetic heads 24 are mounted on the ramp of the ramp load mechanism, the support frame 42 of the carriage 28 contacts the outer stopper 50. In this way, the outer stopper 50 restricts further rotation of the carriage 28 and defines the outward movement limit of the carriage 28 and the magnetic heads 24.

According to the present embodiment, the inner stopper 60 stands between the yokes 45a and 45b which function as supporters, and is arranged on the opposite side of the carriage 28 with respect to the outer stopper 50. As shown by double-dot-dash lines in FIG. 3, when the carriage 28 rotates counterclockwise up to such a position near the inner circumference of the magnetic disks 20, the support frame 42 of the carriage 28 contacts the inner stopper 60. In this way, the inner stopper 60 restricts further rotation of the carriage 28 and defines the inner movement limit of the carriage 28 and the magnetic heads 24.

Figure 4:
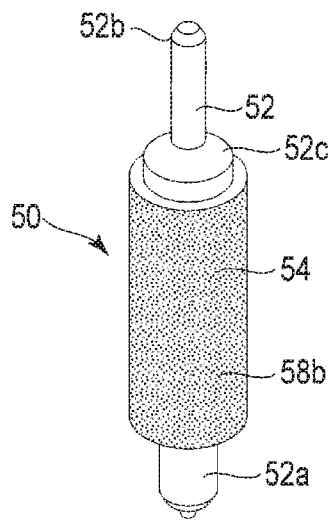
FIG. 4 is a perspective view of an external appearance of an outer stopper.

Next, the structure of the outer stopper 50 will be described in detail. FIG. 4 is a perspective view of the external appearance of the outer stopper, FIG. 5 is an exploded perspective view of the outer stopper, and FIG. 6 is a sectional view of the outer stopper which is attached to the housing 10.

Figure 5:
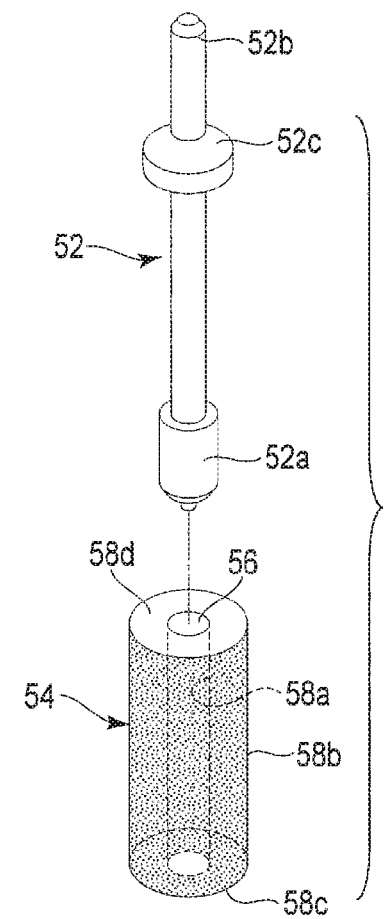
FIG. 5 is an exploded perspective view of the outer stopper.
Figure 6:
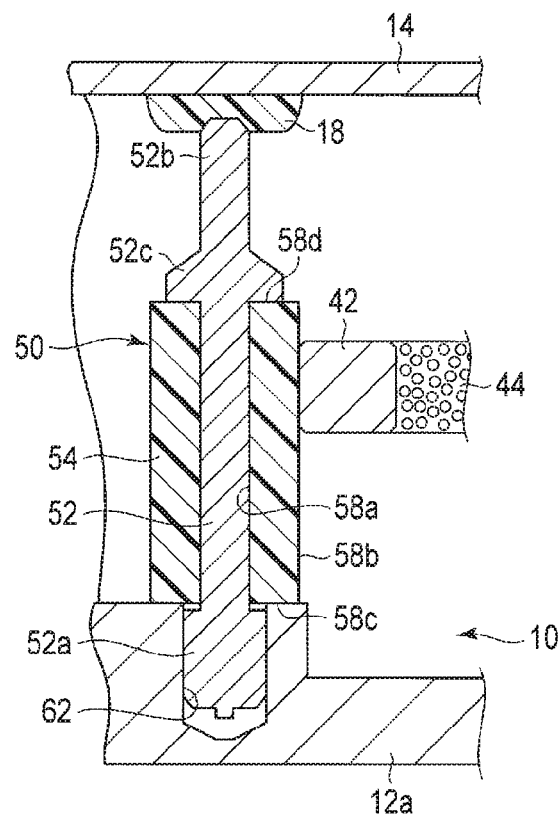
FIG. 6 is a sectional view of the outer stopper which is attached to a housing.

As shown in FIGS. 4 and 5, the outer stopper 50 includes a support shaft (stopper pin) 52 as a metal fixing member, and a cushioning member provided around the support shaft 52, for example, a stopper rubber 54. The support shaft 52 comprises integrally a first end 52a which is located at one end in the axial direction, a second end 52b which is located at the other end in the axial direction, and an annular flange 52c which is provided near the second end 52b. The diameter of the first end 52a is greater than the diameter of the other part of the support shaft 52. As will be described later, the first end 52a is engaged with or fixed to the bottom wall 12a of the base 12, and the support shaft 52 perpendicularly stands with respect to the bottom wall 12a.

The cushioning member is selected from rubbery elastic materials (adhesive materials) whose outgassing characteristics are low enough to have no impact on the function of the HDD and whose hardness is 50 to 80 Hs (JIS-A) such that the cushioning member has predetermined cushioning characteristics, and rubber such as fluorine rubber or butyl rubber or elastomer such as polyurethane elastomer can be used as the material of the cushioning member. In the present embodiment, the stopper rubber 54 is highly-adhesive fluorine rubber and in formed in the shape of a cylinder, for example, a circular cylinder. The stopper rubber 54 includes an inner hole 56 which coaxially penetrates through the stopper rubber 54.

The support shaft 52 is inserted into the inner hole 56, and the stopper rubber 54 is fitted around the support shaft 52 between the first end 52a and the flange 52c.

The stopper rubber 54 includes an inner periphery 58a which defines the inner hole 56, an outer periphery 58b which can contact the carriage 28, a first end surface 58c which is adjacent to the first end 52a of the support shaft 52, and a second end surface 58d which is adjacent to the flange 52c. The inner periphery 58a constitutes a contact surface which is in contact with the surface of the support shaft 52, the first end surface 58c constitutes a first contact surface (seating surface) which can contact the bottom wall 12a of the base 12, and the outer periphery 58b constitutes a second contact surface which can contact the carriage 28.

The stopper rubber 54 is partly subjected to a non-adhesive surface treatment. In the present embodiment, the non-adhesive surface treatment is applied only to the outer periphery (second contact surface) 58b of the stopper rubber 54. The inner periphery 58a, the first end surface (first contact surface) 58c, and the second end surface 58d are not subjected to the non-adhesive surface treatment and have a first surface adhesive force based on the adhesion of fluorine rubber. The outer periphery 58b is subjected to the non-adhesive surface treatment and has a second surface adhesive force which is significantly less than the first surface adhesive force and is, for example, 1/200 to 1/10 the first surface adhesive force, more preferably, less than or equal to 1/20 the first surface adhesive force. In the non-adhesive surface treatment, for example, the outer periphery 58b of the stopper rubber 54 is immersed in a solution which accelerates a cross-linking reaction of fluorine rubber, and in this way, the adhesion and the surface adhesive force of the outer periphery 58b is reduced.

For example, the first surface adhesive force of the surfaces (the inner periphery 58a, the first end 58c, and the second end 58d) which are not subjected to the non-adhesive surface treatment was measured under the following conditions. That is, after a contacting object was left for a predetermined time in a state where the contact object was pressed against the rubber surface under a predetermined application load, the contacting object was removed from the rubber surface, and at this time, the required force (surface adhesive force) was measured.

More specifically, under the following conditions: the material of the contacting object: aluminum, the contact portion: the first end surface (seating surface) of the rubber, the surface roughness Rz: 12.5 µm or less, the application load: 2N, the area of the seating surface of the rubber: 11 mm², the temperature and the humidity at which the contacting object was left: the contacting object was left at 80° C. and 80% RH for one week and was then left at room temperature (25±10° C. and 55±20% RH) for two hours, and the temperature and the humidity at the time of measurement: 25±10° C. and 55±20% RH, the first surface adhesive force was 3N or more.

For example, the second surface adhesive force of the outer periphery (the second contact surface) 58b which is subjected to the non-adhesive surface treatment was measured under the following conditions. That is, after a contacting object was left for a predetermined time in a state where the contact object was pressed against the rubber surface under a predetermined application load, the contacting object was removed from the rubber surface, and at this time, the required force (surface adhesive force) was measured.

More specifically, under the following conditions: the material of the contacting object: aluminum, the contact portion: the outer periphery of the rubber, the surface roughness Rz: 3.2 µm or less, the application load: 1.5N, the contact width: 3 mm, the temperature and the humidity at which the contacting object was left: the contacting object was left at 80° C. and 80% RH for ten hours and was then left at room temperature (25±10° C. and 55±20% RH) for two hours, and the temperature and the humidity at the time of measurement: 25±10° C. and 55±20% RH, the second surface adhesive force was 0.015N or less.

As is evident from the above, the inner periphery 58a, the first end surface 58c and the second end surface 58d of the stopper rubber 54 which are not subjected to the non-adhesive surface treatment have the first surface adhesive force of 3N or more based on the adhesion of fluorine rubber itself. On the other hand, the outer periphery (the second contact surface) 58b of the stopper rubber 54 is subjected to the non-adhesive surface treatment, and the second surface adhesive force is 0.015N or less, that is, the second surface adhesive force is significantly small and is equal to or less than 1/20, for example, 1/213 the first surface adhesive force. It would be sufficient if the second surface adhesive force is not great enough to permanently attach to the carriage 28. Thus, the second surface adhesive force is appropriately adjustable.

As the support shaft 52 is inserted into the inner hole 56, the stopper rubber 54 of the above-described structure is provided around the support shaft 52. The inner periphery 58a of the stopper rubber 54 is pressed against the periphery of the support shaft 52 by the elasticity of the stopper rubber 54 and is in contact with the outer periphery of the support shaft 52. Further, due to the adhesion of fluorine rubber, the inner periphery 58a is adherent or attached to the outer periphery of the support shaft 52. Therefore, the stopper rubber 54 is not rotatable with respect to the support shaft 52 but is fixed to the support shaft 52.

As shown in FIG. 6, as the first end 52a of the support shaft 52 is engaged with an engagement hole 62 which is formed in the bottom wall 12a of the base 12, the outer stopper 50 is fixed to the bottom wall 12a and perpendicularly stands with respect to the bottom wall 12a. Further, the second end 52b of the support shaft 52 is in contact with the packing 18 which is provided on the top cover 14. The support shaft 52 is pushed toward the bottom wall 12a by the elasticity of the packing 18. The stopper rubber 54 is pushed toward the bottom wall 12a by the flange 52c of the support shaft 52. The first end surface (seating surface) 58c of the stopper rubber 54 is pressed against the bottom wall 12a and is attached to the bottom wall 12a around the engagement hole 62. In this way, the stopper rubber 54 seals the engagement hole 62 of the bottom wall 12a airtight.

When the carriage 28 rotates toward the outer circumference of the magnetic disks 20 and approaches to the outward movement limit, the support frame 42 of the carriage 28 collides against the outer periphery 58b of the stopper rubber 54 and stops. At this time, the stopper rubber 54 reduces or absorbs the collision impact from the support frame 42 and stops the carriage 28 at the predetermined position. The outer periphery 58b of the stopper rubber 54 which contacts the support frame 42 is subjected to the non-adhesive surface treatment and has the significantly-small second surface adhesive force. Therefore, even if the support frame 42 is in contact with the outer periphery 58b for a long time, the support frame 42 will not be attached or adhered to the stopper rubber 54.

Note that the inner stopper 60 includes the support shaft 52 and the stopper rubber 54 and has the same structure as that of the outer stopper 50. The inner stopper 60 stands on the yoke 45a which is provided on the base 12 side, and the upper end of the support shaft is engaged or in contact with the yoke 45b. In this way, the inner stopper 60 is arranged between the pair of yokes 45a and the 45b, and the outer periphery of the stopper rubber constitutes the second contact surface which can contact the support frame 42 of the carriage 28. That is, when the carriage 28 rotates toward the inner periphery of the magnetic disks 20 and approaches the inward movement limit, the support frame 42 of the carriage 28 collides against the outer periphery of the inner stopper 60 and stops. At this time, the stopper rubber reduces or absorbs the collision impact from the support frame 42 and stops the carriage 28 at the predetermined position. The outer periphery 58b of the stopper rubber which contracts the support frame 42 is subjected to the non-adhesive surface treatment and has the significantly-small second surface adhesive force. Therefore, even if the support frame 42 is in contact with the inner stopper 60 for a long time, the support frame 42 will not be attached to the inner stopper 60.

Figure 7:
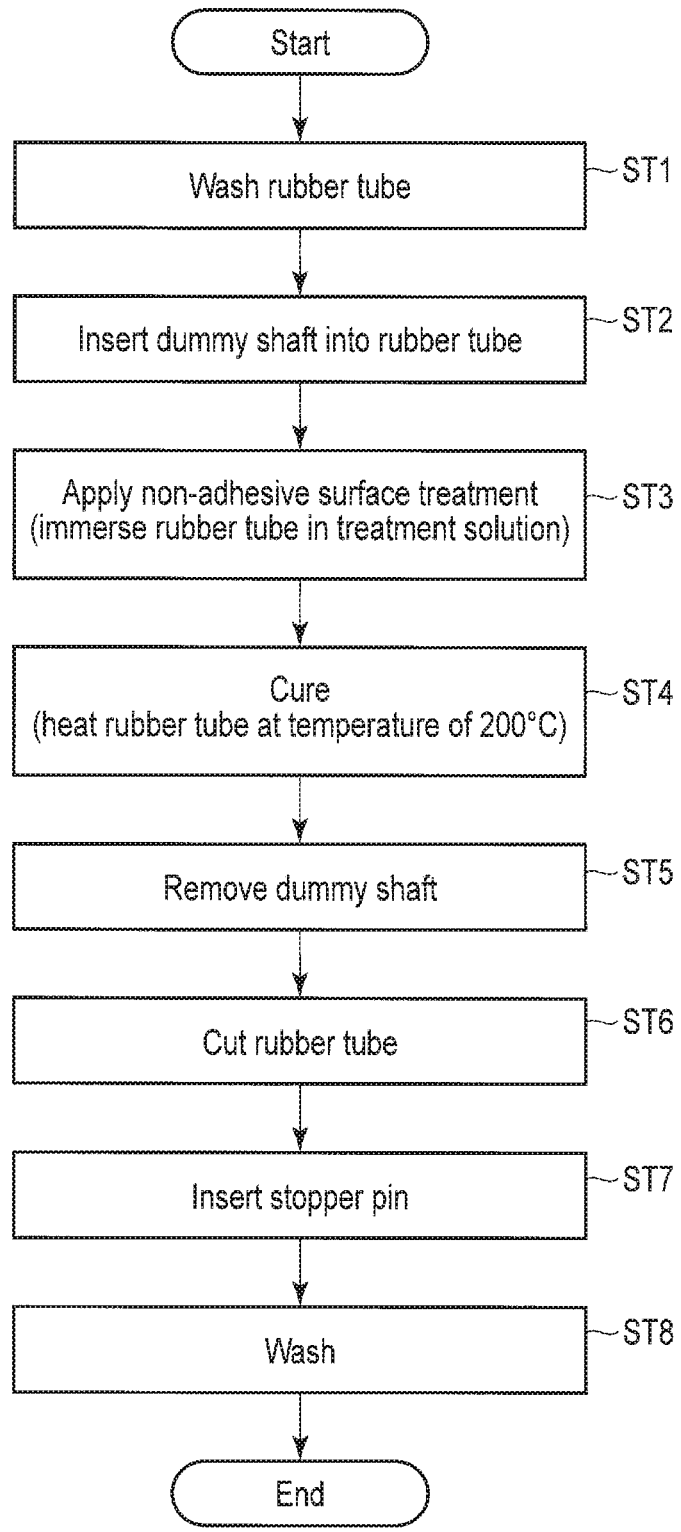
FIG. 7 is a flowchart showing a manufacturing process of the stopper.

Next, an example of a method of manufacturing the stopper will be described. FIG. 7 is a flowchart showing the manufacturing process. As shown in FIG. 7, firstly, a long thin fluorine rubber tube is prepared, and the rubber tube is washed (ST1). A dummy shaft is inserted into the inner hole of the rubber tube, and the rubber tube is firmly attached to the dummy shaft (ST2). Then, the rubber tube is immersed in a treatment solution for a predetermined time, and a non-adhesive surface treatment is applied to the outer periphery of the rubber tube (ST3). After the rubber tube is removed from the treatment solution, the rubber tube is applied to a heat treatment at about 200° C. for one day, and the outer periphery of the rubber tube is cured (cross-linked) (ST4).

Subsequently, the dummy shaft is removed from the rubber tube (ST5), the rubber tube is cut into predetermined lengths, and stopper rubbers are formed (ST6). A support shaft is inserted into the inner hole of the stopper rubber, and the stopper rubber is fixed to the support shaft (ST7). Finally, the whole stopper is washed (ST8), and the stopper is completed.

Note that, when the rubber tube is cut into the stopper rubbers, the sections constitute the first end surface 58c and the second end surface 58d of the stopper rubber 54. It is preferable that the first end surface 58c and the second end surface 58d, in particular, the first end surface (seating surface) 58c should have a small flatness tolerance value such that the first end surface 58c will be in close contact with the supporter of the HDD, in this case, the base bottom wall 12a.

Figure 8:
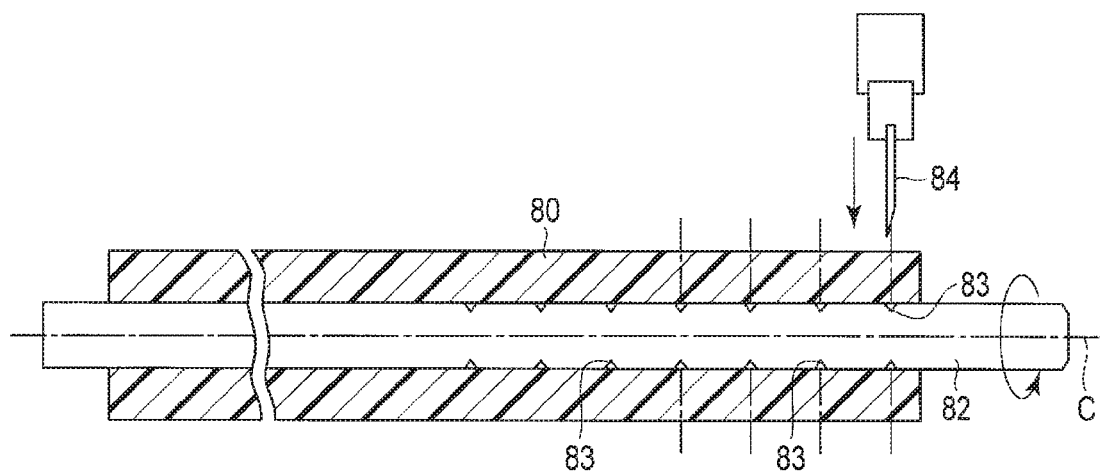
FIG. 8 is a schematic diagram showing an example of a cutting process.

Therefore, in the process of cutting the rubber tube, as shown in FIG. 8, while a dummy shaft 82 is inserted in a rubber tube 80, the rubber tube 80 may be rotated about a central axis C of the dummy shaft 82, and the rubber tube 80 may be cut in by a cutter 84 from the outer periphery of the rubber tube 80 toward the dummy shaft 82. In this case, to release the cutting edge of the cutter 84, notches or grooves 83 may be formed in the outer periphery of the dummy shaft 82 in positions corresponding to cutting positions of the rubber tube 80.

According to the above-described cutting method, since the rubber tube 80 will not be squashed when the rubber tube 80 is cut into the stopper rubbers, a section having a small flatness tolerance value, that is, the first end surface 58c can be formed. It is preferable that the flatness tolerance value of the first end surface 58c should be less than the amount of compression of the stopper rubber 54 which is derived from parameters such as the gutter between the support shaft 52 and the engagement hole 62 of the bottom wall 12a, the length of the support shaft, the hardness of the stopper rubber 54, the hardness of the cover packing 18, and the amount of pressure of the stopper rubber.

According to the HDD of the above-described structure of the present embodiment, in each of the outer stopper 50 and the inner stopper 60, only the second contact surface (outer periphery 58b), which can contact the movable member, of the stopper rubber 54 is subjected to the non-adhesive surface treatment, and the second surface adhesive force of the second contact surface is significantly reduced. Therefore, it is possible to prevent adhesion of the carriage 28 to these stoppers 50 and 60 and to ensure smooth operation of the carriage 28 for a long time. Further, since there is no need to attach any additional member such as an adhesion prevention film or the like to the stopper, the components of the stopper can be reduced, and the manufacturing cost can be reduced, accordingly.

The inner periphery 58a, the first end surface 58c and the second end surface 58d of the stopper rubber 54 are not subjected to the non-adhesive surface treatment and have the great first surface adhesive force based on the adhesion of fluorine rubber. Therefore, the first end surface (seating surface) 58c of the stopper rubber 54 is tightly and firmly adhered to the surface (upper surface) of the bottom wall 12a by the first surface adhesive force. In this way, the stopper rubber 54 seals the engagement hole 62 of the bottom wall 12a airtight. Consequently, even if the carriage 28 collides with the stopper rubber 54 at high speed, a gap will not be formed between the first end surface 58c and the bottom wall 12a, and thus dusts in the engagement hole 62, cutting scraps (contaminations) of aluminum (the base) and the like will definitely be prevented from scattering over the housing 10.

Further, as the flatness tolerance value of the first end surface 58c is reduced, it is possible to make the adhesion of the first end surface 58c to the base wall 12a even across the entire first end surface 58c. Therefore, the first end surface 58c can be more firmly attached to the bottom wall 12a.

Still further, the inner periphery 58a of the stopper rubber 54 is firmly attached to the periphery of the support shaft 52. Therefore, when the carriage 28 collides with the stopper rubber 54 at high speed and even if torque acts on the stopper rubber 54 in the direction of rotating the stopper rubber 54, the stopper rubber 54 will not rotate around the support shaft 52 but will remain fixed. Therefore, contaminations associated with the rotation of the stopper rubber 54 with respect to the support shaft 52 will not be produced, or contaminations associated with the rotation of the stopper rubber with respect to the bottom wall will not be produced or scatter over.

Note that the inner stopper 60 can achieve the same technical effect as that of the outer stopper.

From the above, according to the present embodiment, it is possible to reliably prevent attachment of a movable member and scattering of contaminations, to realize a stopper which can be inexpensively manufactured, and to realize a magnetic disk drive comprising the stopper.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, although the non-adhesive surface treatment is applied to the entire outer periphery of the stopper rubber in the present embodiment, this is in no way restrictive, and the non-adhesive surface treatment may be applied only to the contact area of the outer periphery which can contact the movable member. Further, the shape of the stopper rubber is not limited to a circular cylinder but may be selected from various other shapes. Still further, the movable member which contacts the stopper is not limited to the carriage but may be various other movable members. In the disk drive, the number of the magnetic disks and the number of the magnetic heads can be appropriately increased or reduced as needed, and the magnetic disk can be formed in various other sizes.

What is claimed is:

1. A stopper which regulates movement of a movable member of a disk device, the stopper comprising:
   a fixing member which is to be fixed to a supporter of the disk device; and
   a cushioning member which is formed of a fluorine rubber and is attached to the fixing member, wherein
   the cushioning member includes a contact surface which contacts the fixing member, a first contact surface which is configured to contact the supporter of the disk device, and a second contact surface which is configured to contact the movable member,
   the first contact surface has a first surface adhesive force based on adhesion of the fluorine rubber, and
   the second contact surface is subjected to a non-adhesive surface treatment and has a second surface adhesive force which is less than or equal to $1/20$ the first surface adhesive force.

2. The stopper of claim 1, wherein
the fixing member includes a support shaft which comprises a first end which engages with the supporter of the disk device, and
the cushioning member is formed in a shape of a cylinder with an inner hole into which the support shaft is inserted, and comprises an outer periphery which constitutes the second contact surface and an inner periphery which constitutes the contact surface and defines the inner hole.

3. The stopper of claim 2, wherein
the inner periphery of the cushioning member has the first surface adhesive force based on the adhesion of the fluorine rubber and is attached to the support shaft.

4. The stopper of claim 2, wherein
the first contact surface of the cushioning member is located near the first end of the support shaft and is configured to contact the supporter of the disk device.

5. The stopper of claim 4, wherein
the first contact surface has a flatness tolerance value which is less than an amount of compression of the cushioning member which is derived from parameters including hardness of the fluorine rubber.

6. A disk device comprising:
a base;
a rotatable disk recording medium which is provided in the base;
a head which writes information to the recording medium;
a rotatable carriage which supports the head; and
a stopper which is configured to contact the carriage, wherein
the stopper includes:
a fixing member which is fixed to a supporter of the disk device; and
a cushioning member formed of an adhesive material and attached to the fixing member, wherein
the cushioning member comprises a contact surface which contacts the fixing member, a first contact surface which contacts the supporter, and a second contact surface which is configured to contact the carriage,
the first contact surface has a first surface adhesive force based on adhesion of the adhesive material, and
the second contact surface is subjected to a non-adhesive surface treatment and has a second surface adhesive force which is less than or equal to 1/20 the first surface adhesive force.

7. The disk device of claim 6, wherein
the fixing member includes a support shaft which comprises a first end which engages with the supporter, and
the cushioning member is formed in a shape of a cylinder with an inner hole into which the support shaft is inserted, and comprises an outer periphery which constitutes the second contact surface and an inner periphery which constitutes the contact surface and defines the inner hole.

8. The disk device of claim 7, wherein
the first contact surface of the cushioning member is located near the first end of the support shaft and is configured to contact a surface of the supporter.

9. The disk device of claim 7, wherein
the inner periphery of the cushioning member has the first surface adhesive force based on the adhesion of the adhesive member and is adhered to the support shaft.

10. The disk device of claim 7, wherein
the supporter includes an engagement hole, and the first end of the support shaft is engaged with the engagement hole, and
the first contact surface of the cushioning member is adhered to the supporter around the engagement hole and seals the engagement hole airtight.

11. The disk device of claim 6, wherein
the cushioning member is formed of a fluorine rubber.

* * * * *